(12) United States Patent
Kawada et al.

(10) Patent No.: US 8,564,875 B2
(45) Date of Patent: Oct. 22, 2013

(54) TERAHERTZ WAVE GENERATION DEVICE

(75) Inventors: Yoichi Kawada, Hamamatsu (JP);
Atsushi Nakanishi, Hamamatsu (JP);
Takashi Yasuda, Hamamatsu (JP);
Hironori Takahashi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 314 days.

(21) Appl. No.: 13/128,988

(22) PCT Filed: Sep. 28, 2009

(86) PCT No.: PCT/JP2009/066757
§ 371 (c)(1),
(2), (4) Date: Jun. 16, 2011

(87) PCT Pub. No.: WO2010/055735
PCT Pub. Date: May 20, 2010

(65) Prior Publication Data
US 2011/0242642 A1    Oct. 6, 2011

(30) Foreign Application Priority Data

Nov. 13, 2008    (JP) .................................. 2008-291293

(51) Int. Cl.
*G02F 1/35*    (2006.01)
*H01S 3/10*    (2006.01)

(52) U.S. Cl.
USPC .......................... 359/326; 372/22; 250/504 R (58) Field of Classification Search
USPC .......................................... 359/326; 372/22
See application file for complete search history.

(56) References Cited

U.S. PATENT DOCUMENTS

| 5,912,910 A | 6/1999 | Sanders et al. |
| 2004/0131093 A1 | 7/2004 | Waarts et al. |

(Continued)

FOREIGN PATENT DOCUMENTS

| JP | 2003-302666 | 10/2003 |
| JP | 2005-066798 | 3/2005 |

OTHER PUBLICATIONS

J. Hebling, et al., "Tunable THz pulse generation by optical rectification of ultrashort laser pulses with tilted pulse fronts", Applied Physics B, Mar. 2004, vol. 78, No. 5, p. 593-599.

(Continued)

*Primary Examiner* — Hemang Sanghavi
(74) *Attorney, Agent, or Firm* — Drinker Biddle & Reath LLP (57) ABSTRACT

A terahertz wave generating apparatus 2 includes an excitation light source 10, a transmission-type diffraction grating 32, a variable imaging optical system 61, and a nonlinear optical crystal 70. The transmission-type diffraction grating 32 inputs pulsed excitation light output from the excitation light source 10, and diffracts and outputs the pulsed excitation light. In the transmission-type diffraction grating 32, its orientation is variable with a straight central axis, that is parallel to the grooves and passing through an incident position of a principal ray of the pulsed excitation light. The variable imaging optical system 61 is configured to input the pulsed excitation light diffracted to be output by the transmission-type diffraction grating 32, to form an image of the pulsed excitation light by the transmission-type diffraction grating 32, and its imaging magnification is variable. The nonlinear optical crystal 70 is disposed at a position at which the pulsed excitation light is formed as the image by the variable imaging optical system 61, and inputs the pulsed excitation light via the variable imaging optical system 61, and generates a terahertz wave T. Thereby, a terahertz wave generating apparatus, in which it is easy to adjust a phase matching condition, can be realized.

2 Claims, 7 Drawing Sheets

(56) References Cited

U.S. PATENT DOCUMENTS

2004/0165639 A1\* 8/2004 Lang et al. .................... 372/92
2013/0075629 A1\* 3/2013 Doi et al. ................. 250/504 R

OTHER PUBLICATIONS

J. Hebling, et al., "High-Power THz Generation, THz Nonlinear Optics, and THz Nonlinear Spectroscopy", IEEE Journal of Selected Topics in Quantum Electronics, Apr. 2008, vol. 14, No. 2, p. 345-353.

J. Hebling, et al., "Velocity matching by pulse front tilting for large-area THz-pulse generation", Optics Express, Oct. 21, 2002, vol. 10, No. 21, p. 1161-1166.

K.L. Yeh, et al., "Generation of high average power 1 kHz shaped THz pulses via optical rectification", Optics Communications, Jul. 1, 2008, vol. 281, No. 13, p. 3567-3570.

A.G. Stepanov, et al., "Efficient generation of subpicosecond terahertz radiation by phase-matched optical rectification using ultrashort laser pulses with tilted pulse fronts", Applied Physics Letters, Oct. 13, 2003, vol. 83, No. 15, p. 3000-3002.

\* cited by examiner

TERAHERTZ WAVE GENERATION DEVICE

TECHNICAL FIELD

The present invention relates to a terahertz wave generating apparatus.

BACKGROUND ART

A terahertz wave is an electromagnetic wave having a frequency of approximately 0.01 THz to 100 THz corresponding to an intermediate range between light waves and radio waves, and has an intermediate property between light waves and radio waves. As an application of such a terahertz wave, a technology for acquiring information on a measuring object by measuring a temporal waveform of an electric field amplitude of a terahertz wave which is transmitted through or is reflected by the measuring object has been studied.

A technology for measuring information on a measuring object by use of a terahertz wave is generally as follows. That is, pulsed light output from a light source (for example, a femtosecond laser light source) is split into two components to be pulsed excitation light and pulsed detection light by a branching part. The pulsed excitation light among those is input to a terahertz wave generating element (for example, a nonlinear optical crystal or a photoconductive antenna element), and a pulsed terahertz wave is generated from the terahertz wave generating element thereby. This generated terahertz wave is transmitted through or reflected by a measuring object part as a measurement light, to acquire information on the measuring object (for example, an absorption coefficient, a refractive index), and thereafter, the terahertz wave is made incident on a terahertz wave detecting element (for example, an electro-optic crystal or a photoconductive antenna element) in substantially the same timing as that of the pulsed detection light.

In the terahertz wave detecting element to which the terahertz wave and the pulsed detection light are input, a correlation between both light components is detected. For example, in the case in which an electro-optic crystal is used as the terahertz wave detecting element, the terahertz wave and the pulsed detection light are coupled by a coupling part, to be made incident on the electro-optic crystal, and birefringence is induced in accordance with propagation of the terahertz wave in the electro-optic crystal, and a polarization state of the pulsed detection light is changed by the birefringence. A change in the polarization state of the pulsed detection light in the electro-optic crystal is detected, and as a result, an electric field amplitude of the terahertz wave is detected, which enables to acquire information on the measuring object.

Terahertz wave generating apparatus of various configurations for generating terahertz waves have been known. One of those terahertz wave generating apparatus is configured to make pulsed excitation light incident into a nonlinear optical crystal to generate a terahertz wave from the nonlinear optical crystal. In such a conventional terahertz wave generating apparatus, a type of nonlinear optical crystal suitable for terahertz wave generation is determined according to a central wavelength of the pulsed excitation light. For example, in the case where pulsed excitation light with a central wavelength of 800 nm is used, a ZnTe crystal is broadly used as a nonlinear optical crystal on the basis of a phase matching condition for the pulsed excitation light and the terahertz wave in the nonlinear optical crystal. When pulsed excitation light with a central wavelength of 800 nm is incident into a ZnTe crystal, a pulsed terahertz wave is generated coaxially with the pulsed excitation light.

In recent years, it has become apparent that, even in a combination of pulsed excitation light of a central wavelength and a nonlinear optical crystal in which a phase matching condition is not usually satisfied, the pulsed excitation light whose pulse front is tilted is made incident into the nonlinear optical crystal, to enable to satisfy the phase matching condition (refer to Non Patent Documents 1 to 3).

CITATION LIST

Non Patent Literature

Non Patent Document 1: J. Hebling, et al., Optics Express 10, 1161 (2002).
Non Patent Document 2: J. Hebling, et al., Appl. Phys. B 78, 593 (2004).
Non Patent Document 3: J. Hebling, et al., IEEE J. Selected Topics in Quantum Electron. 14, 345 (2008).

SUMMARY OF INVENTION

Technical Problem

However, the inventors have found that the terahertz wave generating apparatus respectively described in Non Patent Documents 1 to 3 have the following problems. That is, because a tilt angle of a pulse front of pulsed excitation light is set so as to satisfy a phase matching condition for a terahertz wave at a specific frequency, in order to satisfy the phase matching condition for a terahertz wave at a frequency different from the terahertz wave at the frequency that is initially designed, it is necessary to adjust the tilt angle of the pulse front of the pulsed excitation light.

Meanwhile, in the terahertz wave generating apparatus respectively described in Non Patent Documents 1 to 3, when a tilt angle of a pulse front of pulsed excitation light is changed, an optical path of the pulsed excitation light traveling toward a nonlinear optical crystal as well is changed, therefore, it is necessary to readjust the optical path or redesign the optical system. Accordingly, in the terahertz wave generating apparatus respectively described in Non Patent Documents 1 to 3, it is not easy to adjust a tilt angle of a pulse front of pulsed excitation light (i.e., to adjust a phase matching condition), and it is not easy to change a frequency of a terahertz wave as well.

The present invention has been achieved in order to solve the above-described problems, and an object of the present invention is to provide a terahertz wave generating apparatus in which it is easy to adjust a phase matching condition.

Solution to Problem

A terahertz wave generating apparatus according to the present invention includes: (1) an excitation light source outputting pulsed excitation light; (2) a transmission-type diffraction grating inputting the pulsed excitation light output from the excitation light source, and diffracting and outputting the pulsed excitation light, in which an orientation is variable with a straight central axis, that is parallel to the grooves and passing through an incident position of a principal ray of the pulsed excitation light; (3) a variable imaging optical system inputting the pulsed excitation light diffracted to be output by the transmission-type diffraction grating, and forming an image of the pulsed excitation light by the transmission-type diffraction grating onto a predetermined plane, in which an imaging magnification is variable; and (4) a nonlinear optical crystal, disposed at a position at which the pulsed excitation light is formed as the image by the variable imaging optical system, inputting the pulsed excitation light passing through the variable imaging optical system, and generating a terahertz wave.

In the terahertz wave generating apparatus, pulsed excitation light output from the excitation light source is input to the transmission-type diffraction grating to be diffracted, so as to tilt its pulse front. The pulsed excitation light diffracted by the transmission-type diffraction grating to be output so as to tilt the pulse front is formed as an image on the nonlinear optical crystal by the variable imaging optical system. Then, the pulsed excitation light is input to the nonlinear optical crystal disposed at the position on which the pulsed excitation light is imaged by the variable imaging optical system, to generate a terahertz wave from the nonlinear optical crystal.

In particular, in the terahertz wave generating apparatus, the transmission-type diffraction grating is used as means for tilting the pulse front of the pulsed excitation light, and an orientation of the transmission-type diffraction grating is set, to be capable of adjusting a tilt angle of the pulse front of the pulsed excitation light, and more significantly adjusting a tilt angle of the pulse front of the pulsed excitation light by the variable imaging optical system in which its imaging magnification is variable. Additionally, in the terahertz wave generating apparatus, even when a tilt angle of the pulse front of the pulsed excitation light is significantly adjusted in this way, an output direction of the pulsed excitation light from the transmission-type diffraction grating is not changed, and therefore, it is easy to adjust or optimize a phase matching condition.

Advantageous Effects of Invention

The present invention provides a terahertz wave generating apparatus in which it is easy to adjust a phase matching condition.

DESCRIPTION OF EMBODIMENTS

Hereinafter, an embodiment for carrying out the present invention will be described in detail referring to the accompanying drawings. The same components are denoted with the same reference symbols in the description of the drawings, and overlapping description will be omitted. Further, hereinafter, after a terahertz wave generating apparatus of a comparative example is described, a terahertz wave generating apparatus of the present embodiment is described.

Figure 1:
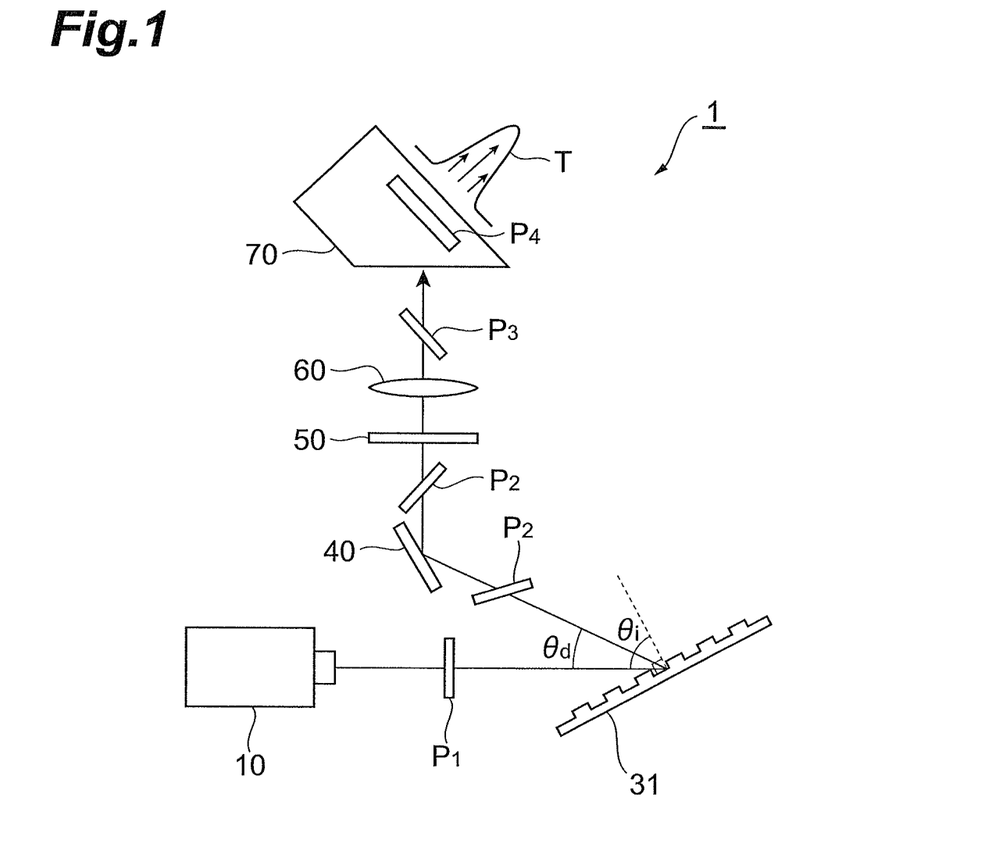
FIG. 1 is a diagram illustrating a configuration of a terahertz wave generating apparatus 1 of a comparative example.

FIG. 1 is a diagram illustrating a configuration of a terahertz wave generating apparatus 1 of a comparative example. The terahertz wave generating apparatus 1 of the comparative example shown in this figure includes an excitation light source 10, a reflection-type diffraction grating 31, a mirror 40, a half-wave plate 50, an imaging optical system 60, and a nonlinear optical crystal 70.

The excitation light source 10 is configured to output pulsed excitation light to be incident into the nonlinear optical crystal 70 in order to generate a terahertz wave. The excitation light source 10 is preferably a pulsed laser light source outputting ultrashort pulsed laser light, that is a femtosecond laser light source, for example. The reflection-type diffraction grating 31 is configured to input the pulsed excitation light output from the excitation light source 10, and reflect and diffract the pulsed excitation light to output the pulsed excitation light. Incidence and output of the pulsed excitation light are carried out on the same side of the reflection-type diffraction grating 31.

The mirror 40 reflects the pulsed excitation light diffracted to be output by the reflection-type diffraction grating 31 to the half-wave plate 50. The half-wave plate 50 is configured to input the pulsed excitation light reflected by the mirror 40, and to adjust a polarization state of the pulsed excitation light to output the pulsed excitation light to the imaging optical system 60. The imaging optical system 60 is configured to input the pulsed excitation light diffracted and output by the reflection-type diffraction grating 31 to pass through the mirror 40, to form an image of the pulsed excitation light by the reflection-type diffraction grating 31.

The nonlinear optical crystal 70 is disposed at a position at which the pulsed excitation light is formed as an image by the imaging optical system 60, and is configured to input the pulsed excitation light passing through the imaging optical system 60, to generate a terahertz wave T. The nonlinear optical crystal 70 is, for example, a LiNbO$_3$ crystal (sLN crystal) or LiTaO$_3$ crystal (sLT crystal) of fixed ratio composition, ZnTe, GaP, or the like.

In the terahertz wave generating apparatus 1 configured in this way, the pulsed excitation light output from the excitation light source 10 has a pulse front $P_1$ perpendicular to a principal ray before incidence of the light into the reflection-type diffraction grating 31, and has a pulse front $P_2$ tilted with respect to a plane perpendicular to the principal ray after diffraction of the light by the reflection-type diffraction grating 31. A tilt angle of the pulse front $P_2$ of the pulsed excitation light diffracted by the reflection-type diffraction grating 31 is dependent on a wavelength of the pulsed excitation light, a grating period of the reflection-type diffraction grating 31, and an incident angle of the pulsed excitation light on the reflection-type diffraction grating 31.

Further, a tilt angle of a pulse front $P_3$ of the pulsed excitation light imaged by the imaging optical system 60 is dependent on a tilt angle of the pulse front $P_2$ of the pulsed excitation light before incidence of the light into the imaging optical system 60, and an imaging magnification of the imaging optical system 60. Moreover, a tilt angle of a pulse front $P_4$ of the pulsed excitation light during propagation of the light inside the nonlinear optical crystal 70 is dependent on a tilt angle of the pulse front $P_3$ of the pulsed excitation light before incidence of the light into the nonlinear optical crystal 70, and a refractive index of the nonlinear optical crystal 70.

Accordingly, provided that a tilt angle of the pulse front $P_4$ of the pulsed excitation light during propagation of the light inside the nonlinear optical crystal 70 is appropriately set in view of a wavelength of the pulsed excitation light, a frequency of the terahertz wave, refractive indices of the nonlinear optical crystal 70 with respect to the respective pulsed excitation light and terahertz wave, an orientation of a crystal axis of the nonlinear optical crystal 70, and the like, it is possible to satisfy a phase matching condition.

According to the terahertz wave generating apparatus 1, even in a combination of pulsed excitation light with a central wavelength and the nonlinear optical crystal 70 in which a phase matching condition is not usually satisfied, pulsed excitation light whose pulse front is tilted is made incident into the nonlinear optical crystal 70, to be capable of satisfying the phase matching condition. Then, a highly efficient nonlinear optical crystal unsuitable for use in a usual phase matching method is made fit for use for pulsed excitation light of a broad range of wavelengths. The terahertz wave T generated in this way is extremely high intensity, that is, not only utilized as a measurement light in conventional spectroscopic measurement, but also capable of excitation of a sample by the terahertz wave T itself.

Meanwhile, it is not easy to adjust a tilt angle of a pulse front of pulsed excitation light. A tilt angle of a pulse front of pulsed excitation light is changed by adjusting the angle of the reflection-type diffraction grating 31, however, at the same time, an optical path of the pulsed excitation light after diffraction of the light as well is changed, therefore, it is necessary to readjust the optical path of the pulsed excitation light or redesign the optical system.

Figure 2:
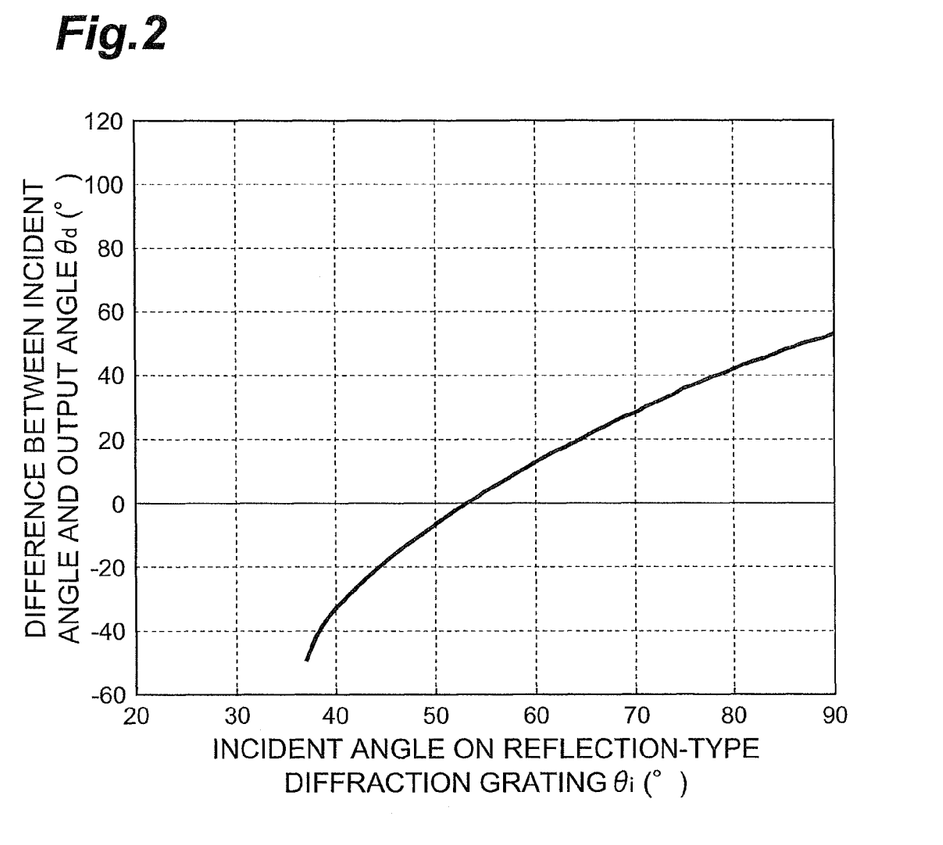
FIG. 2 is a graph showing a relationship between incident angle $\theta_i$ of pulsed excitation light incident on a reflection-type diffraction grating 31 and angle $\theta_d$ between an incident direction and an output direction in the terahertz wave generating apparatus 1 of the comparative example.

FIG. 2 is a graph showing a relationship between incident angle $\theta_i$ of pulsed excitation light incident on the reflection-type diffraction grating 31 and angle $\theta_d$ between an incident direction and an output direction in the terahertz wave generating apparatus 1 of the comparative example. Here, a central wavelength of the pulsed excitation light is set to 800 nm, and a number of lines of the reflection-type diffraction grating 31 is set to 2000 grooves/mm. As is clear from the graph, for example, when an incident angle $\theta_i$ of the pulsed excitation light on the reflection-type diffraction grating 31 is changed from 48 degrees to 58 degrees, the optical path of the pulsed excitation light output from the reflection-type diffraction grating 31 is changed by approximately 20 degrees.

Further, in principle, an imaging magnification of the imaging optical system 60 is changed to be capable of changing a tilt angle of a pulse front of pulsed excitation light, however, since an image of the pulsed excitation light on the reflection-type diffraction grating 31 should be formed on the nonlinear optical crystal 70, it is necessary to readjust the optical path or redesign the optical system.

Moreover, because a tilt angle of a pulse front of pulsed excitation light is set so as to satisfy a phase matching condition with respect to a terahertz wave at a specific frequency, in order to satisfy the phase matching condition with respect to a terahertz wave at a frequency different from the terahertz wave at the frequency that is initially designed, it is necessary to adjust the tilt angle of the pulse front of the pulsed excitation light. However, this adjustment is not easy as described above.

In this way, in the terahertz wave generating apparatus 1 of the comparative example, when a tilt angle of a pulse front of pulsed excitation light is changed, an optical path of the pulsed excitation light traveling toward the nonlinear optical system 70 as well is changed, therefore, it is necessary to readjust the optical path or redesign the optical system. Accordingly, in the terahertz wave generating apparatus 1 of the comparative example, it is not easy to adjust a tilt angle of a pulse front of pulsed excitation light (i.e., to adjust a phase matching condition), and it is not easy to change a frequency of a terahertz wave as well.

Figure 3:
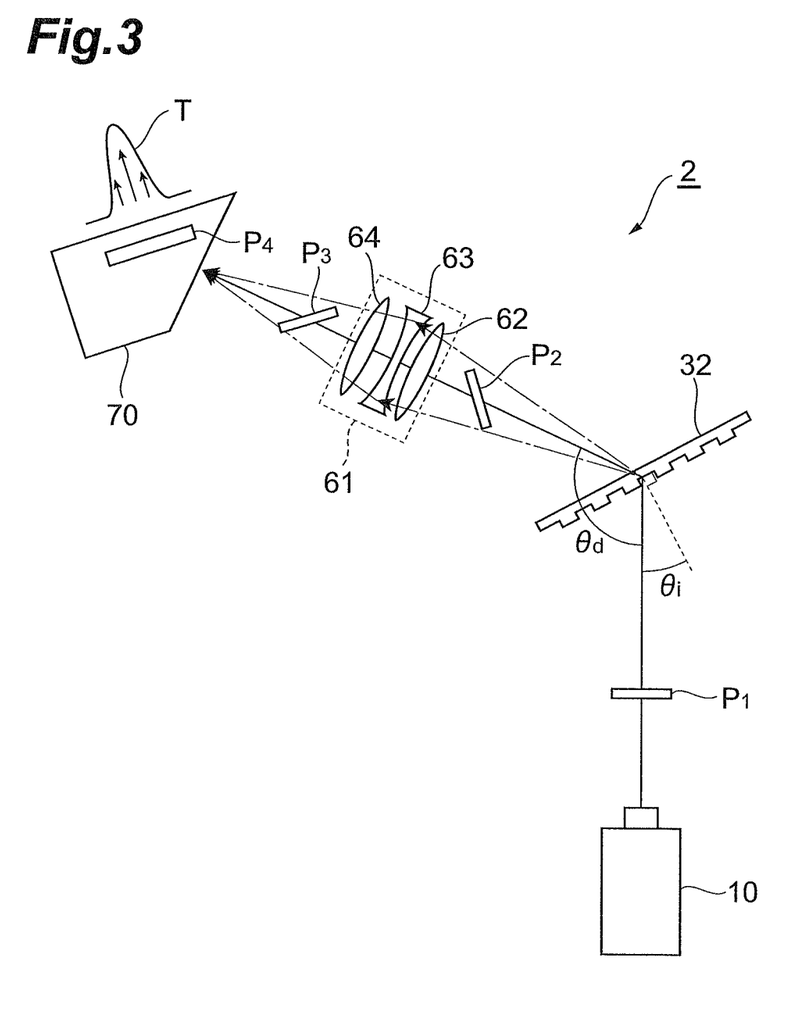
FIG. 3 is a diagram illustrating a configuration of a terahertz wave generating apparatus 2 according to an embodiment.

A terahertz wave generating apparatus 2 of an embodiment which will be described next is configured to be capable of solving the problems that the terahertz wave generating apparatus 1 of the comparative example has. FIG. 3 is a diagram illustrating a configuration of a terahertz wave generating apparatus 2 according to an embodiment. The terahertz wave generating apparatus 2 of the present embodiment shown in this figure includes an excitation light source 10, a transmission-type diffraction grating 32, a variable imaging optical system 61, and a nonlinear optical crystal 70.

The excitation light source 10 and the nonlinear optical crystal 70 included in the terahertz wave generating apparatus 2 of the present embodiment are respectively the same as those included in the terahertz wave generating apparatus 1 of the comparative example.

The terahertz wave generating apparatus 2 of the present embodiment includes, not a reflection-type diffraction grating, but the transmission-type diffraction grating 32. The transmission-type diffraction grating 32 is configured to input pulsed excitation light output from the excitation light source 10, and diffract the pulsed excitation light to output the pulsed excitation light. Incidence and output of the pulsed excitation light are carried out on sides opposite to one another of the transmission-type diffraction grating 32. Further, in the transmission-type diffraction grating 32, its orientation is variable with a straight central axis, that is parallel to the grooves and passing through an incident position of a principal ray of the pulsed excitation light.

The variable imaging optical system 61 has a configuration including a convex lens 62, a concave lens 63, and a convex lens 64 in FIG. 3, however, the variable imaging optical system is not limited to this configuration, and may have various configurations. The variable imaging optical system 61 is configured to input the pulsed excitation light diffracted to be output by the transmission-type diffraction grating 32, to form an image of the pulsed excitation light by the transmission-type diffraction grating 32, and its imaging magnification is variable.

The nonlinear optical crystal 70 is disposed at a position at which the pulsed excitation light is formed as an image by the variable imaging optical system 61, and is configured to input the pulsed excitation light via the variable imaging optical system 61, to generate a terahertz wave T. The nonlinear optical crystal 70 preferably has a shape in which pulsed excitation light is perpendicularly incident on a certain incident surface, and a terahertz wave is perpendicularly emitted from a certain emitting surface.

In the terahertz wave generating apparatus 2 configured in this way, the pulsed excitation light output from the excitation light source 10 has a pulse front $P_1$ perpendicular to a principal ray before incidence of the light into the transmission-type diffraction grating 32, and has a pulse front $P_2$ tilted with respect to a plane perpendicular to the principal ray after diffraction of the light by the transmission-type diffraction grating 32. A tilt angle of the pulse front $P_2$ of the pulsed excitation light diffracted by the transmission-type diffraction grating 32 is dependent on a wavelength of the pulsed excitation light, a grating period of the transmission-type diffraction grating 32, and an incident angle of the pulsed excitation light on the transmission-type diffraction grating 32.

Further, a tilt angle of a pulse front $P_3$ of the pulsed excitation light imaged by the variable imaging optical system 61 is dependent on a tilt angle of the pulse front $P_2$ of the pulsed excitation light before incidence of the light into the variable imaging optical system 61, and an imaging magnification of the variable imaging optical system 61. Moreover, a tilt angle of a pulse front $P_4$ of the pulsed excitation light during propagation of the light inside the nonlinear optical crystal 70 is dependent on a tilt angle of the pulse front $P_3$ of the pulsed excitation light before incidence of the light into the nonlinear optical crystal 70, and a refractive index of the nonlinear optical crystal 70.

Accordingly, in the terahertz wave generating apparatus 2 as well, provided that a tilt angle of the pulse front $P_4$ of the pulsed excitation light during propagation of the light inside the nonlinear optical crystal 70 is appropriately set in view of a wavelength of the pulsed excitation light, a frequency of the terahertz wave, a refractive index of the nonlinear optical crystal 70 with respect to the respective pulsed excitation light and terahertz wave, an orientation of a crystal axis of the nonlinear optical crystal 70, and the like, it is possible to satisfy a phase matching condition.

According to the terahertz wave generating apparatus 2, even in a combination of pulsed excitation light of a central wavelength and the nonlinear optical crystal 70 in which a phase matching condition is not usually satisfied, pulsed excitation light whose pulse front is tilted is made incident into the nonlinear optical crystal 70, to be capable of satisfying the phase matching condition. Then, a highly efficient nonlinear optical crystal unsuitable for use in a usual phase matching method is made fit for use for pulsed excitation light of a broad range of wavelengths. The terahertz wave T generated in this way is extremely high intensity, that is, not only utilized as a measurement light in conventional spectroscopic measurement, but also capable of excitation of a sample by the terahertz wave T itself.

Figure 4:
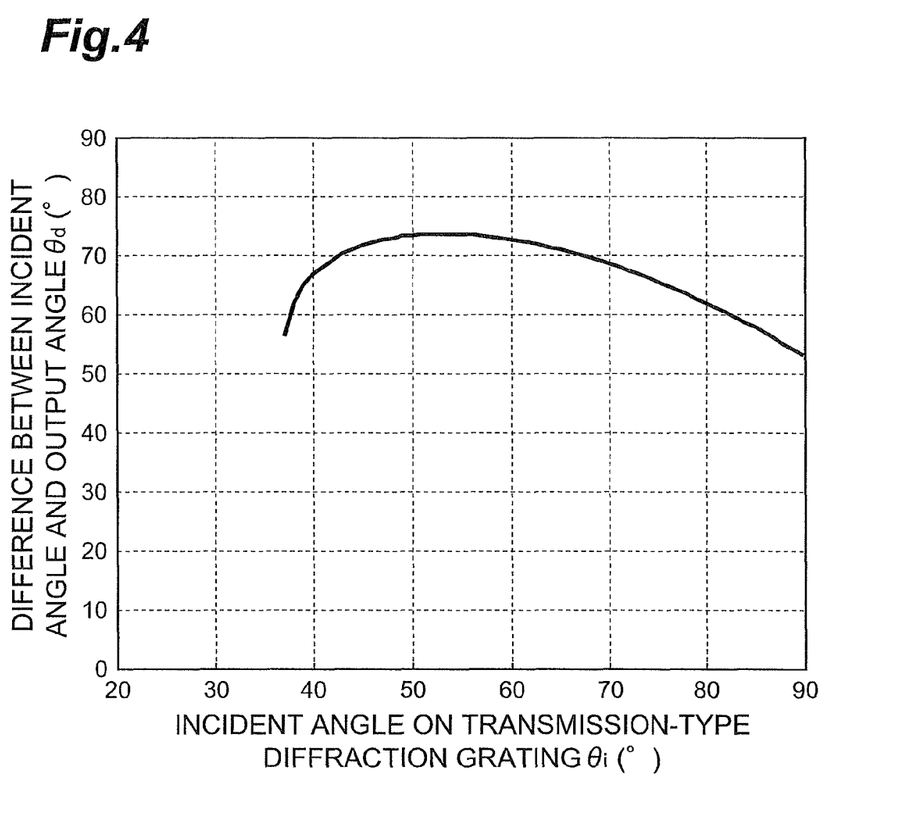
FIG. 4 is a graph showing a relationship between incident angle $\theta_i$ of pulsed excitation light incident on a transmission-type diffraction grating 32 and angle $\theta_d$ between an incident direction and an output direction in the terahertz wave generating apparatus 2 of the embodiment.

FIG. 4 is a graph showing a relationship between incident angle $\theta_i$ of pulsed excitation light incident on the transmission-type diffraction grating 32 and angle $\theta_d$ between an incident direction and an output direction in the terahertz wave generating apparatus 2 of the present embodiment. In the same way as in the case of the comparative example (FIG. 2), here, a central wavelength of the pulsed excitation light is set to 800 nm, and a number of lines of the transmission-type diffraction grating 32 is set to 2000 grooves/mm. As is clear from the graph, an output direction of the pulsed excitation light from the transmission-type diffraction grating 32 does not change in a range of approximately 10 degrees centering around 53 degrees of incident angle $\theta_i$ of the pulsed excitation light into the transmission-type diffraction grating 32. Therefore, in this range, even when an orientation of the transmission-type diffraction grating 32 is changed, a tilt of the pulse front $P_2$ of the pulsed excitation light can be changed without changing an optical path of the pulsed excitation light output from the transmission-type diffraction grating 32.

Figure 5:
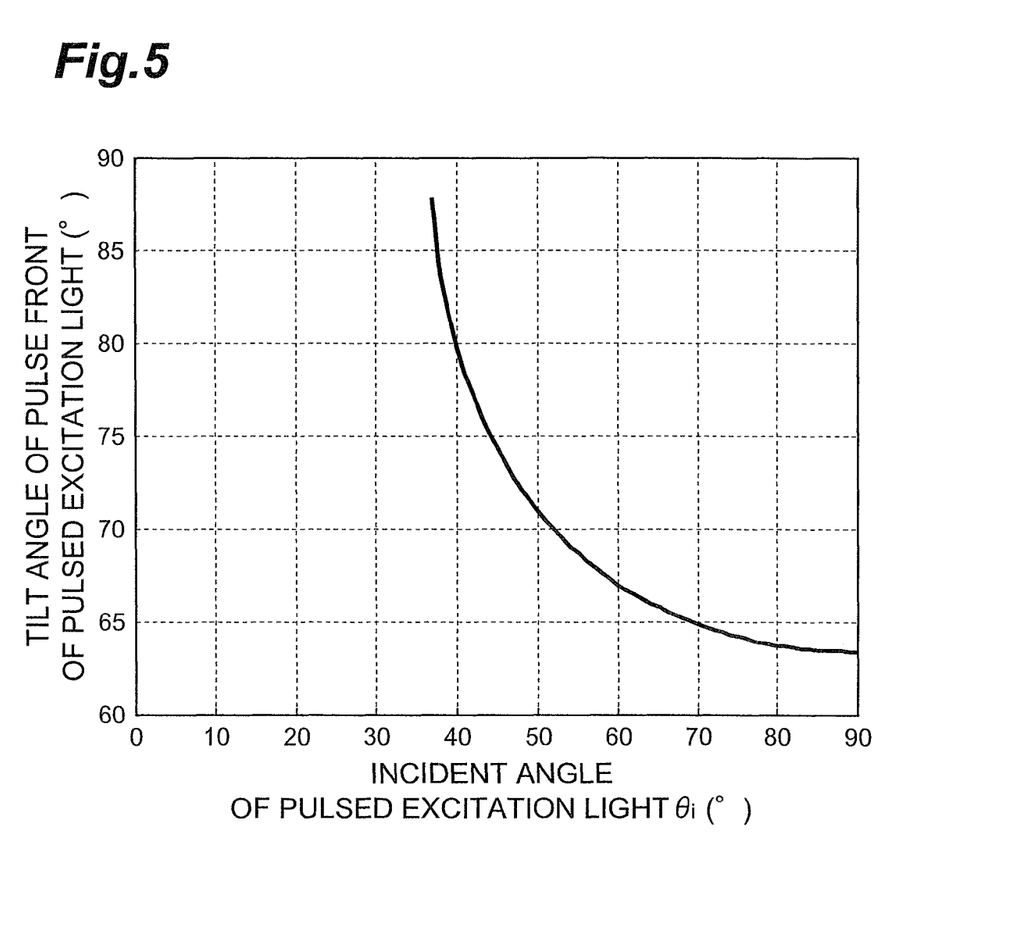
FIG. 5 is a graph showing a relationship between incident angle $\theta_i$ of pulsed excitation light incident on the transmission-type diffraction grating 32 and tilt angle of a pulse front $P_2$ of the pulsed excitation light output from the transmission-type diffraction grating 32 in the terahertz wave generating apparatus 2 of the embodiment.

FIG. 5 is a graph showing a relationship between incident angle $\theta_i$ of pulsed excitation light incident on the transmission-type diffraction grating 32 and tilt angle of the pulse front $P_2$ of the pulsed excitation light output from the transmission-type diffraction grating 32 in the terahertz wave generating apparatus 2 of the present embodiment. As is clear from the graph, for example, when an incident angle $\theta_i$ of the pulsed excitation light incident on the transmission-type diffraction grating 32 is changed from 48 degrees to 58 degrees, a tilt angle of the pulse front $P_2$ of the pulsed excitation light output from the transmission-type diffraction grating 32 can be changed from 72 degrees to 67 degrees.

Figure 6:
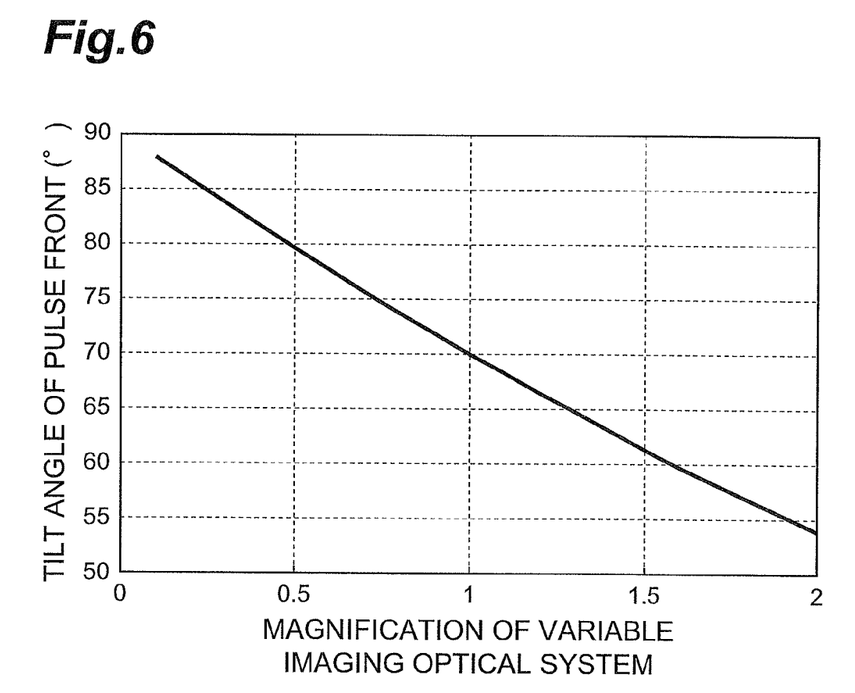
FIG. 6 is a graph showing a relationship between imaging magnification of a variable imaging optical system 61 and tilt angle of a pulse front $P_3$ of the pulsed excitation light formed as an image by the variable imaging optical system 61 in the terahertz wave generating apparatus 2 of the embodiment.

FIG. 6 is a graph showing a relationship between imaging magnification of the variable imaging optical system 61 and tilt angle of the pulse front $P_3$ of the pulsed excitation light formed as an image by the variable imaging optical system 61 in the terahertz wave generating apparatus 2 of the present embodiment. Here, a tilt angle of the pulse front $P_2$ of the pulsed excitation light input to the variable imaging optical system 61 is set to 70 degrees. As is clear from the graph, an imaging magnification of the variable imaging optical system 61 is changed to be capable of changing a tilt angle of the pulse front $P_3$ of the pulsed excitation light imaged by the variable imaging optical system 61. For example, when an imaging magnification of the variable imaging optical system 61 is changed from 0.1 to 2, a tilt angle of the pulse front $P_3$ of the pulsed excitation light can be changed significantly in a range from 88 degrees to 54 degrees.

The variable imaging optical system 61 in the terahertz wave generating apparatus 2 of the present embodiment has the feature in that a magnification of an image of pulsed excitation light (i.e., a tilt angle of a pulse front of the pulsed excitation light) can be arbitrarily changed while keeping a relationship of imaging on the transmission-type diffraction grating 32 and the nonlinear optical crystal 70, that is, without changing a distance between the transmission-type diffraction grating 32 and the nonlinear optical crystal 70, and without generating a wavefront distortion of the pulsed excitation light.

When the pulsed excitation light having the tilted pulse front $P_3$ is incident into the nonlinear optical crystal 70, and the pulsed excitation light having the tilted pulse front $P_4$ propagates inside the nonlinear optical crystal 70, a terahertz wave is generated in accordance therewith in the nonlinear optical crystal 70. At this time, a tilt angle of the pulse front $P_4$ of the pulsed excitation light propagating inside the nonlinear optical crystal 70 is in view of a refractive index of the nonlinear optical crystal 70, to be adjusted so as to satisfy a phase matching condition.

As described above, the terahertz wave generating apparatus 2 of the present embodiment uses the transmission-type diffraction grating 32 as means for tilting a pulse front of pulsed excitation light, and sets an orientation of the transmission-type diffraction grating 32 to be capable of adjusting a tilt angle of the pulse front $P_2$ of the pulsed excitation light, and more significantly adjusting a tilt angle of the pulse front $P_3$ of the pulsed excitation light by the variable imaging optical system 61.

Additionally, in the terahertz wave generating apparatus 2 of the present embodiment, even when a tilt angle of the pulse front $P_3$ of the pulsed excitation light is significantly adjusted in this way, an output direction of the pulsed excitation light from the transmission-type diffraction grating 32 is not changed, and therefore, it is easy to adjust or optimize a phase matching condition. For example, at the time of generation of a terahertz wave, a phase matching condition in the nonlinear optical crystal 70 is continuously changed while monitoring a terahertz wave signal, to be capable of optimizing the phase matching condition. Further, a generation condition corresponding to a terahertz wave at an arbitrary frequency can be easily realized. Therefore, frequency selectivity of the terahertz wave is available.

Figure 7:
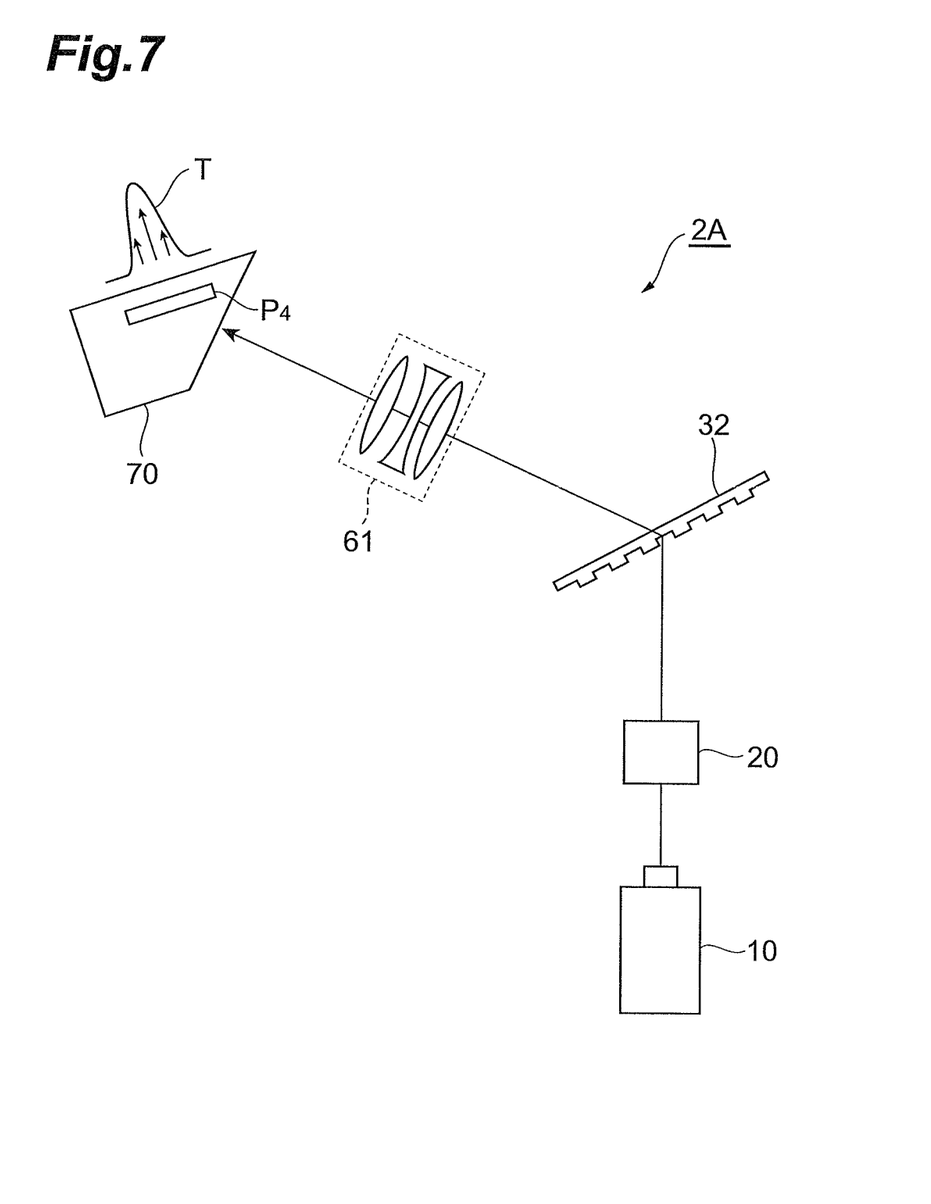
FIG. 7 is a diagram illustrating a configuration of a modification example of a terahertz wave generating apparatus according to the embodiment.

FIG. 7 is a diagram illustrating a configuration of a modification example of a terahertz wave generating apparatus of the embodiment. A terahertz wave generating apparatus 2A shown in this figure includes a dispersion compensating unit 20 in addition to the configuration of the terahertz wave generating apparatus 2 shown in FIG. 3. The dispersion compensating unit 20 is provided on an optical path between the excitation light source 10 and the transmission-type diffraction grating 32, and is configured to make a pulse width of pulsed excitation light output from the excitation light source 10 have a pulse width and a pulse shape most suitable for generating a terahertz wave.

In some cases, pulsed excitation light undergoes dispersion by the transmission-type diffraction grating 32, the variable imaging optical system 61, the nonlinear optical crystal 70, and the like, to stretch its pulse width. Then, the dispersion compensating unit 20 exerts arbitrary dispersion in advance on pulsed excitation light, to be capable of making the pulsed excitation light reaching the nonlinear optical crystal 70 have a pulse width and a pulse shape most suitable for generating a terahertz wave. In addition, as the dispersion compensating unit 20, a prism pair, a diffraction grating pair, a waveform shaping device, or the like may be utilized.

The terahertz wave generating apparatus according to the present invention is not limited to the above-described embodiment and the configuration example, and may be variously modified.

Here, the terahertz wave generating apparatus according to the above-described embodiment has a configuration including: (1) an excitation light source for outputting pulsed excitation light; (2) a transmission-type diffraction grating that is configured to input the pulsed excitation light output from the excitation light source, and diffract and output the pulsed excitation light, in which an orientation is variable with a straight central axis, that is parallel to the grooves and passing through an incident position of a principal ray of the pulsed excitation light; (3) a variable imaging optical system that is configured to input the pulsed excitation light diffracted to be output by the transmission-type diffraction grating, and form an image of the pulsed excitation light by the transmission-type diffraction grating onto a predetermined plane, in which its imaging magnification is variable; and (4) a nonlinear optical crystal that is disposed at a position at which the pulsed excitation light is formed as the image by the variable imaging optical system, and is configured to input the pulsed excitation light from the variable imaging optical system, and generate a terahertz wave.

Further, it is preferable that the terahertz wave generating apparatus having the above-described configuration further includes a dispersion compensating unit, provided on an optical path between the excitation light source and the transmission-type diffraction grating, and compensating for dispersion of the pulsed excitation light output from the excitation light source. In this case, even when a pulse width of the pulsed excitation light stretches by the transmission-type diffraction grating and the variable imaging optical system, the dispersion compensating unit exerts arbitrary dispersion in advance on the pulsed excitation light, to be capable of making the pulsed excitation light reaching the nonlinear optical crystal have a pulse width and a pulse shape most suitable for generating a terahertz wave.

INDUSTRIAL APPLICABILITY

The present invention is available as a terahertz wave generating apparatus in which it is easy to adjust a phase matching condition.

REFERENCE SIGNS LIST 1, 2, 2A—terahertz wave generating apparatus, 10—excitation light source, 20—dispersion compensating unit, 31—reflection-type diffraction grating, 32—transmission-type diffraction grating, 40—mirror, 50—half-wavelength plate, 60—imaging optical system, 61—variable imaging optical system, 62 to 64—lens, 70—nonlinear optical crystal.

The invention claimed is:

1. A terahertz wave generating apparatus comprising:
   an excitation light source outputting pulsed excitation light;
   a transmission-type diffraction grating inputting the pulsed excitation light output from the excitation light source, and diffracting and outputting the pulsed excitation light, in which an orientation is variable with a straight central axis, that is parallel to the grooves and passing through an incident position of a principal ray of the pulsed excitation light;
   a variable imaging optical system inputting the pulsed excitation light diffracted to be output by the transmission-type diffraction grating, and forming an image of the pulsed excitation light by the transmission-type diffraction grating onto a predetermined plane, in which an imaging magnification is variable; and
   a nonlinear optical crystal, disposed at a position at which the pulsed excitation light is formed as the image by the variable imaging optical system, inputting the pulsed excitation light passing through the variable imaging optical system, and generating a terahertz wave.

2. The terahertz wave generating apparatus according to claim 1, further comprising a dispersion compensating unit, provided on an optical path between the excitation light source and the transmission-type diffraction grating, and making the pulsed excitation light output from the excitation light source have a pulse width and a pulse shape most suitable for generating the terahertz wave.

* * * * *

UNITED STATES PATENT AND TRADEMARK OFFICE
CERTIFICATE OF CORRECTION

PATENT NO.       : 8,564,875 B2
APPLICATION NO. : 13/128988
DATED            : October 22, 2013
INVENTOR(S)      : Kawada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 348 days.

Signed and Sealed this

Fifteenth Day of September, 2015

Michelle K. Lee
*Director of the United States Patent and Trademark Office*